United States Patent [19]
Hogan

[11] Patent Number: 5,961,870
[45] Date of Patent: Oct. 5, 1999

[54] MICROWAVE ROTATING APPARATUS FOR CONTINUOUSLY PROCESSING MATERIAL

[76] Inventor: Jim S. Hogan, 1742 Country Club Dr., Sugar Land, Tex. 77478

[21] Appl. No.: 08/887,099

[22] Filed: Jul. 2, 1997

[51] Int. Cl.[6] .............................. H05B 6/78; H05B 6/80
[52] U.S. Cl. ...................... 219/679; 219/686; 219/700; 219/762
[58] Field of Search .................... 219/700, 701, 219/699, 685, 762, 753, 746, 748, 679, 686; 204/157.15, 157.49, 902

[56] References Cited

U.S. PATENT DOCUMENTS

| | | | |
|---|---|---|---|
| 3,261,959 | 7/1966 | Connell et al. | 219/700 |
| 3,263,052 | 7/1966 | Jeppson et al. | 219/700 |
| 3,549,848 | 12/1970 | Williams | 219/700 |
| 3,777,095 | 12/1973 | Muranaka | 219/700 |
| 4,144,189 | 3/1979 | Kirkbride | 252/414 |
| 4,279,722 | 7/1981 | Kirkbride | 204/162 |
| 4,280,033 | 7/1981 | Wagener et al. | 219/700 |
| 4,687,895 | 8/1987 | Chitre et al. | 219/701 |
| 4,872,954 | 10/1989 | Hogan | 202/105 |
| 4,880,952 | 11/1989 | Hirai et al. | 219/685 |
| 4,954,681 | 9/1990 | Ishikawa et al. | 219/701 |
| 5,227,026 | 7/1993 | Hogan | 202/117 |
| 5,523,060 | 6/1996 | Hogan | 422/184.1 |

FOREIGN PATENT DOCUMENTS

| | | | |
|---|---|---|---|
| 0500792 | 2/1992 | European Pat. Off. . | |
| 52-30938 | 3/1977 | Japan | 219/700 |

*Primary Examiner*—Philip H. Leung
*Attorney, Agent, or Firm*—Conley, Rose & Tayon, P.C.

[57] ABSTRACT

An apparatus and method for the processing of a material in a sealed rotating drum by exposing the material to an electromagnetic field, and more particularly to a source of microwave energy, while the material is moving through the drum. The material is moved through the drum by fixed specially shaped fins on the inside of the drum, a freely rotating spiral on the inside of the drum, or placing the drum on a slope to move the material by gravity. Special carriers are placed in the drum to recirculate in the drum and mull and grind the material and keep the drum wall clean. If the material is to be processed by a microwave and the material being processed is microwave absorptive, the carriers can be made of a microwave reflective material such as stainless steel. If the material is to be processed by a microwave and the material being processed is microwave transparent, the carriers can be made of an absorptive material such as magnetic steel.

17 Claims, 4 Drawing Sheets

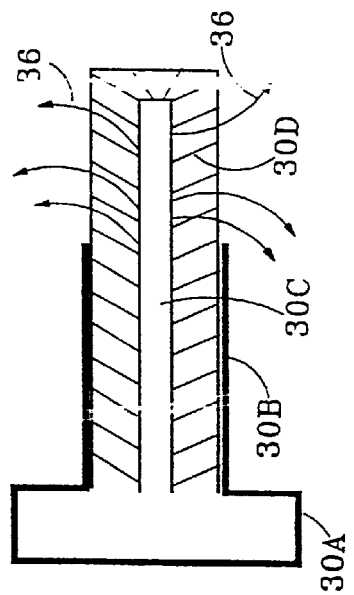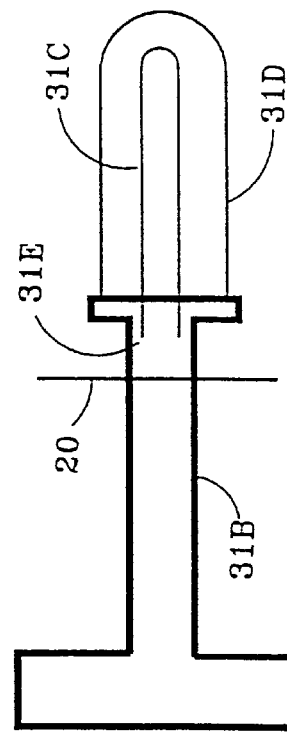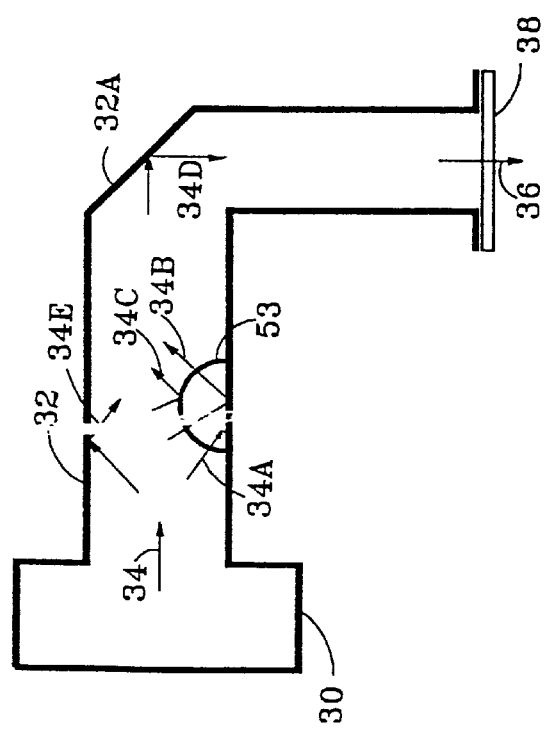

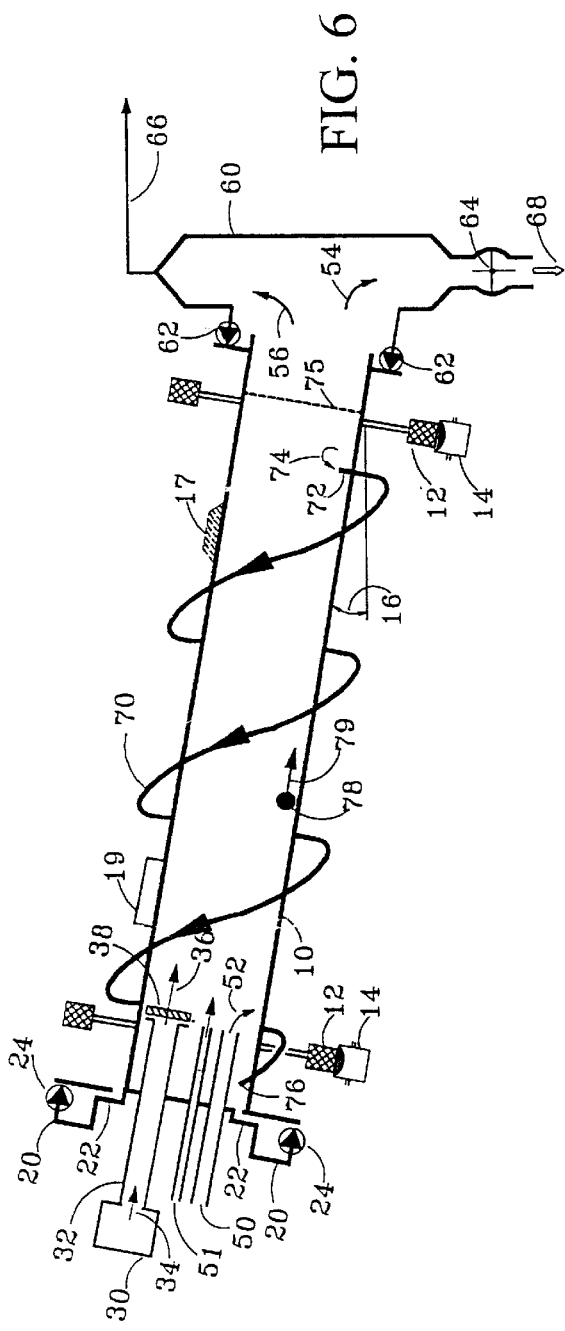
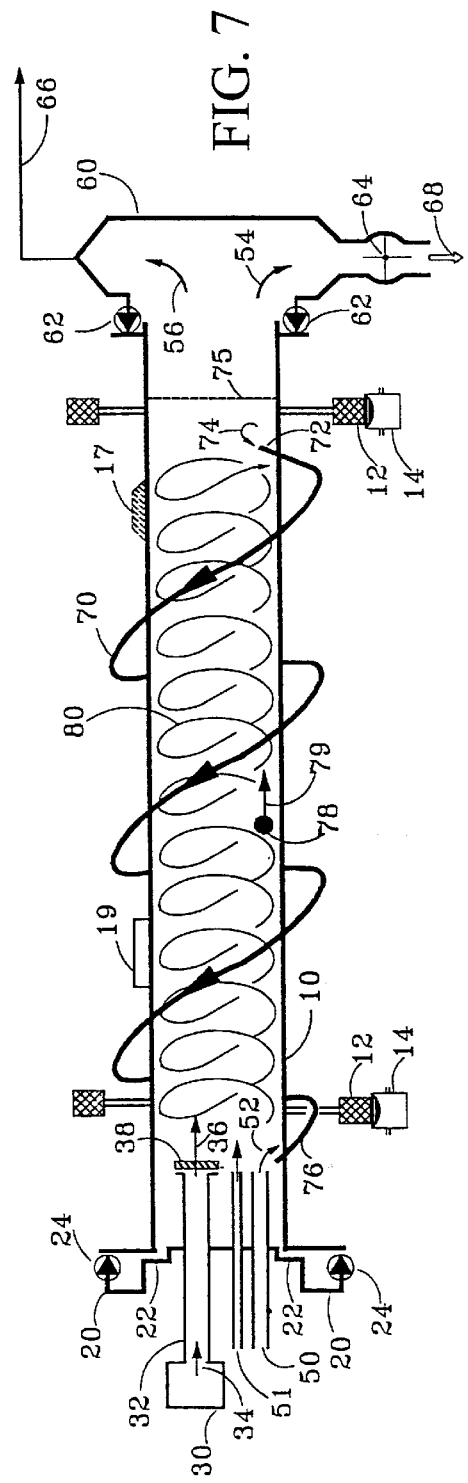

MICROWAVE ROTATING APPARATUS FOR CONTINUOUSLY PROCESSING MATERIAL

FIELD OF THE INVENTION

This invention relates to a method and apparatus for processing a material in a rotating drum with an electromagnetic field. When the electromagnetic field is of microwave frequency, select sections of the drum are made of special reflective material for selectively reflecting the microwave; various ways are shown for moving the material from the inlet of the drum to the outlet of the drum.

BACKGROUND OF THE INVENTION

There are many reasons that it is of interest to industry to heat materials. One method of heating material is to flow the material through a rotating drum and apply heat to the outside of the drum or a flame on the inside of the drum. A flame on the inside of the drum is sometimes undesirable because of the products of combustion produced by the flame, and sometimes exposing the material directly to the flame is undesirable. A flame on the outside of the drum is sometimes undesirable because the drum wall must be made of material that will withstand high temperature. In fact, for very high temperatures, there is no suitable material that is a good heat conductor and will withstand a flame directly on the outside of the drum wall.

It is a well known fact that electromagnetic waves can impart heat to a material when the material absorbs the energy from such waves. Infrared radiation, that portion of the electromagnetic spectrum that extends from the long wavelength, or red, end of the visible light range to the microwave range, is absorbed by window glass and water, but quartz is transparent to infrared radiation. However, window glass is transparent to visible light frequencies. Microwave energy is reflected by some materials, such as aluminum and stainless steel, absorbed by other materials, such as water and tungsten carbide, while other materials such as quartz and teflon are transparent to microwaves. For example, a potato in a microwave oven can be heated by the microwave energy while the ceramic saucer holding the potato cannot. The ceramic saucer holding the potato will get hot by conduction of heat from the potato but will not get as hot as the potato, since the potato is essentially being heated from the inside out.

Accordingly, a good clean method for heating certain materials is to use microwaves; however, most methods that use microwaves today are "batch" processes. Industry needs an improved "continuous" process for applying electromagnetic waves to certain materials.

The use of rotating drums to convey materials while using heat to modify such material, either chemically or physically, is well known in the art. Examples of such an apparatus may be found, for example, in my U.S. Pat. No. 4,872,954, issued Oct. 10, 1989; U.S. Pat. No. 5,078,836, issued Jan. 2, 1992; U.S. Pat. No. 5,227,026, issued Jul. 13, 1993; U.S. Pat. No. 5,523,060, issued Jun. 4, 1996; and application Ser. No. 08/755,671 filed Nov. 25, 1996.

SUMMARY OF THE INVENTION

The present invention comprises an apparatus and a method for exposing a material to electromagnetic waves while the material is being conveyed inside a rotating drum. The material flows or is fed to the inside of the drum through a stationary bulkhead that is attached to the rotating drum with seals to seal the inside of the drum from the atmosphere surrounding the drum. A waveguide is also attached to and through that bulkhead, or a stationary bulkhead at the opposite end of the drum, for conveying electromagnetic waves to the inside of the drum.

The material being heated may selectively be heated in one end of the drum by applying heat on the outside of the drum to vaporize the majority of the liquid in the material being heated. Then, in the other end of the drum, the material is exposed to energy waves to apply the final heat to the material. This allows the majority of the heat load being absorbed by the material to be applied to the material at a lower temperature that can be tolerated by the drum wall and electromagnetic waves to be applied to heat the material to a higher temperature in a different section of the drum.

The electromagnetic energy may be applied to the inside of the rotating drum through a waveguide, a hollow circular or rectangular tube constructed of a reflective material such as aluminum or stainless steel, or through a coaxial cable, which consists of a tubular conductor surrounding a central conduit separated and held in place by an insulated sheath. Carriers inside the drum can selectively be reflective when processing a material that absorbs microwave energy, or the carriers can be made of a material that absorbs microwave energy for processing a material that is transparent to microwave energy. Fixed or freely rotating internals inside the rotating drum can be made of reflective material selectively shaped for selectively reflecting the microwave energy inside the rotating drum.

It is therefore an object of the present invention to provide an apparatus for heating a material by exposing the material to electromagnetic waves inside a rotating drum.

It is also an object of the present invention to provide an improved method of applying electromagnetic waves to a material to alter the material either physically or chemically.

It is also an object of the present invention to alter the physical condition of an oily emulsion by exposing the oily emulsion to microwave energy inside a rotating drum.

It is also an object of the present invention to provide an improved method to decontaminate a solid catalyst containing a solid contaminant by heating the catalyst with electromagnetic waves inside a rotating drum containing a selective gas that chemically alters the contaminate and which can be later treated and removed from the catalyst by water washing.

It is also an object of the present invention to provide a method of removing a radioactive microwave absorptive material from a non-radioactive microwave transparent material by vaporizing the radioactive material with a microwave energy and removing the vapors.

It is also an object of the present invention to reform a hydrocarbon material in the presence of a catalyst that is recirculating in a rotating drum by heating the material and the catalyst with microwaves.

It is also an object of the present invention to provide an apparatus to chemically combine material with heat by heating the material with electromagnetic waves inside a rotating drum.

It is also an object of the present invention to provide an apparatus for heating a microwave transparent material with microwaves inside a rotating drum that recirculates a microwave absorptive material with the microwave transparent material.

Other objects and advantages of the invention will become more apparent upon a consideration of the preferred embodiments described hereinafter.

BRIEF DESCRIPTION OF THE DRAWINGS

For a detailed description of the preferred embodiments of the invention, reference will now be made to the accompanying drawings, wherein;

FIG. 1 is a schematic cross-sectional view of one form of a waveguide for transmitting microwaves.

FIG. 2 is a schematic cross-sectional view of another form of a waveguide, or a coaxial cable, for transmitting microwaves.

FIG. 3 is a schematic cross-sectional view of a coaxial cable indicating generation of an infrared wave inside a rotating drum.

FIG. 6 is the same as FIG. 4 except that carriers have been added to the inside of the drum and a spiral conduit has been attached to the outside of the drum for recirculating the carriers from the drum outlet to the drum inlet.

FIG. 7 is the same as FIG. 6 except that a freely rotating spiral has been added to the inside of the drum for moving the material and carriers from the inlet of the drum to the outlet of the drum, and the drum of FIG. 7 does not have a slope.

In the drawings, like items for the various figures have the same numbers and these numbers are numerically tabulated with a brief description for easy reference as follows:

Figure 4:
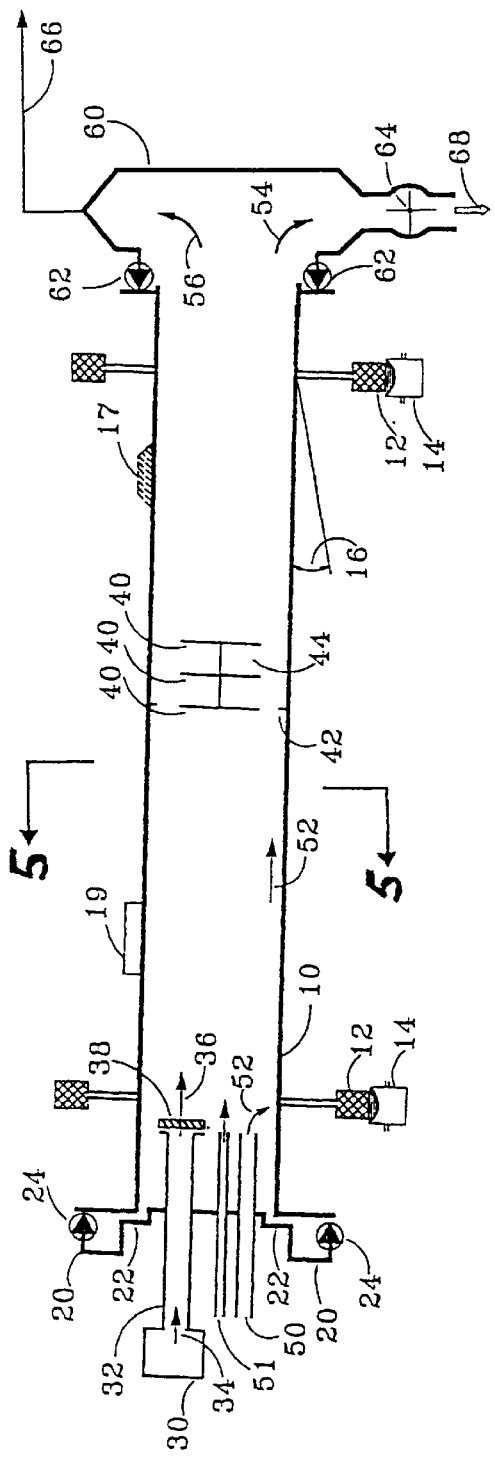
FIG. 4 is a schematic drawing of one embodiment of the invention showing a rotating drum placed on a slope so that the processed materials move longitudinally of the drum by gravity, a feed and microwave conduit bulkhead, and a product separator.

| ITEM NO. | ITEM DESCRIPTION |
| --- | --- |
| 10 | Rotatable drum |
| 12 | Wheel supporting the rotatable drum |
| 14 | Roller for supporting the wheel |
| 16 | Slope angle of drum |
| 17 | Insulation on drum |
| 18 | Drum rotation direction |
| 19 | Cooling fins on drum |
| 20 | Feed bulkhead |
| 22 | Bulkhead microwave choke |
| 24 | Bulkhead and drum seal |
| 30 | Microwave generator |
| 30 A | Figure 2 Microwave generator |
| 30 B | Microwave coaxial cable outside shield |
| 30 C | Microwave coaxial cable inside conductor |
| 30 D | Microwave coaxial cable shield and conductor insulator |
| 31 A | Figure 3 Electrical generator |
| 31 B | Figure 3 Coaxial cable |
| 31 C | Heating element |
| 31 D | Heating element shield |
| 31 E | Heating element electrical connectors |
| 32 | Microwave waveguide |
| 32 A | Bend in waveguide wall |
| 34 | Microwave in microwave waveguide |
| 34 A | Microwave being absorbed by 53 material |
| 34 B | Microwave passing through 53 material |
| 34 C | Microwave reflected by 53 material |
| 34 D | Microwave reflected by 32A wall |
| 34 E | Microwave reflected off the inside of the waveguide |
| 36 | Microwave out of microwave waveguide |
| 38 | Microwave waveguide outlet closure |

-continued

| ITEM NO. | ITEM DESCRIPTION |
| --- | --- |
| 40 | Microwave reflectors in drum |
| 42 | Gap in microwave reflectors |
| 44 | Space between microwave reflectors |
| 50 | Line for feeding the drum with the material being processed |
| 51 | Line for flowing a gas to the drum |
| 52 | Feed material to be processed |
| 53 | Material in Figure 1 waveguide |
| 54 | Processed liquids and/or solids from the processed material |
| 56 | Processed gasses from the processed material |
| 57 | Movement of feed adjacent to drum inside wall |
| 58 | Movement of feed nearest to drum center |
| 59 | Depth of feed |
| 60 | Outlet separator |
| 62 | Outlet separator and drum seal |
| 64 | Vapor lock valve |
| 66 | Vapor line from outlet separator or feed bulkhead |
| 68 | Solids and/or liquids from outlet separator |
| 70 | Spiral conduit attached to drum outside |
| 72 | Spiral conduit inlet |
| 74 | Lift for placing carriers in conduit |
| 75 | Solids and carriers separating screen |
| 76 | Outlet of carriers conduit |
| 78 | Carriers |
| 79 | Arrow showing flow of carriers |
| 80 | Freely rotating spiral inside of drum |
| 100 | Tube to remove material from drum |
| 102 | Tube inlet to tube 100 |
| 104 | Tube outlet to tube 100 |

BRIEF DESCRIPTION OF ELECTROMAGNETIC WAVES

The electromagnetic spectrum is well known in the industry, and the following is only intended to summarize some of the characteristics of electromagnetic waves to help show some advantages and characteristics of the present invention. Electromagnetic energy varies in frequency from less than that radiated by power lines, usually 60 cycles per second, to gamma and cosmic rays. Since electromagnetic energy travels at the speed of light, the wavelength can be determined by dividing the speed of light by the frequency. Assuming the speed of light to be about 186,000 miles per second, the wavelength of infrared radiation nearest the visible spectrum is about 0.78 microns long.

One hertz (Hz) is equal to one cycle per second, one kilohertz (kHz) is 1,000 Hz, one megahertz ($MH_z$) is 1,000,000 Hz, and one gigahertz ($GH_z$) is 1,000,000,000 Hz. The approximate wavelength range in meters and frequency range in hertz for some command electromagnetic waves is tabulated below.

| | approximate wavelength range (meters) | approximate frequency range (hertz) |
| --- | --- | --- |
| Radio waves | 10–1,000 | $3 \times 10^5 - 3 \times 10^7$ |
| Television waves | 1–10 | $3 \times 10^7 - 3 \times 10^8$ |
| Microwaves, radar | $1 \times 10^{-3} - 1$ | $3 \times 10^8 - 3 \times 10^{11}$ |
| Infrared | $8 \times 10^{-7} - 1 \times 10^{-3}$ | $3 \times 10^{11} - 4 \times 10^{14}$ |
| Visible light | $4 \times 10^{-7} - 7 \times 10^{-7}$ | $4 \times 10^{14} - 7 \times 10^{14}$ |
| Ultraviolet | $1 \times 10^{-8} - 4 \times 10^{-7}$ | $7 \times 10^{14} - 3 \times 10^{15}$ |
| X rays | $5 \times 10^{-12} - 1 \times 10^{-8}$ | $3 \times 10^{16} - 6 \times 10^{19}$ |
| Gamma rays | $1 \times 10^{-13} - 5 \times 10^{-12}$ | $6 \times 10^{19} - 3 \times 10^{21}$ |
| Cosmic rays | less than $1 \times 10^{-13}$ | greater than $3 \times 10^{21}$ |

According to the above, it can easily be seen that it is not practical to use a container large enough to contain a low frequency electromagnetic wave. So, microwave frequencies, and higher, are preferred for heating material in a container. Microwaves are usually considered to be electromagnetic waves having a frequency of between 300 MH$_z$ and 300 GH$_z$. However, the Federal Communication Commission (FCC) has assigned a microwave frequency of between 900 MH$_z$ and 930 MH$_z$ to be used for industrial applications. Accordingly, most industrial microwave generators are made to generate a microwave having a frequency of 915 MH$_z$, plus or minus 5 MH$_z$, to stay within the FCC assigned frequency. Other frequencies, such as 2.45 GH$_z$ 5.85 GH$_z$, and 28 GH$_z$ may be used by industry, but, these frequencies have a wavelength that is too short for many industrial uses.

Other electromagnetic frequencies, lower than microwave frequencies, have been assigned by the FCC for industrial use. However, these frequencies such as 13 MH$_z$ and 27 MH$_z$ have a wavelength that is too long for many industrial uses.

However, infrared frequencies (radiant heat) are often used by industry to heat material. The infrared wavelength varies from less than 1 micron at the red end of the visible light frequency to about 1,000 microns at the end of the microwave frequency. Industrial infrared heaters usually work by applying a current to an electrical resistive heating element. Most of the heat emitted by the hot surface of such a heating element is infrared.

BRIEF DESCRIPTION OF A WAVEGUIDE

A waveguide is a device that confines and directs the propagation of electromagnetic waves, or electrical energy source, to the destination. Reference is made to FIG. 1 of the drawings that shows a commonly used waveguide for microwaves. FIG. 1 shows a microwave generator 30 that generates a microwave 34 that travels down the inside of waveguide 32. Waveguide 32 is a hollow rectangular or circular tube made of microwave reflective material such as aluminum or stainless steel. A common size for a rectangular tube used by industry for 915 MH$_z$ microwave is 5 inches high by 10 inches wide.

In FIG. 1, microwave 34 reflects off the inside wall of tube 32 as shown by 34E. To make a turn in tube 32, the wall of tube 32 can be shaped as shown at 32A and then microwave 34 reflects off of 32A as shown at 34D. Then the microwave 34 travels through seal 38, made of microwave transparent material, as shown by 36.

Material mass 53 of FIG. 1 shows the effect of microwaves on different types of material. If material 53 is a microwave absorptive material, the microwave is absorbed as shown by 34A. If material 53 is reflective, the microwave is reflected as shown by 34C. And, if material 53 is microwave transparent, the microwave travels through material 53 and is reflected by the inside wall of tube 32 and back through material 53 as shown by 34B.

FIG. 2 shows a different kind of a microwave waveguide which is really a coaxial cable. Microwave generator 30A transfers microwaves to the outside of conductor 30C. Conductor 30C is surrounded by a dielectric insulator 30D that separates conductor 30C from the outside conducting shield 30B. Microwaves 36 are emitted from conductor 30C in the portion of the coaxial cable that extends outside the microwave shield 30B.

Electromagnetic waves such as microwaves and infrared waves do not need a conductor to travel from the energy source to the destination. For example, the infrared rays from the sun travel through space to the earth without a conductor. However, the microwaves must be contained in a waveguide such as the reflective walls of waveguide 32 in FIG. 1 to avoid harming surrounding people or objects.

Because the wavelength of infrared waves is so short, materials that reflect infrared waves can be heated because a thin layer of non-reflective impurities on the surface of the reflective material is heated by the infrared waves and, in turn, the reflective material is heated by conduction from the heated non-reflective material. Accordingly, the waveguides of FIG. 1 and FIG. 2 do not make acceptable waveguides for infrared waves.

FIG. 3 shows one method of emitting infrared waves inside a rotating drum. Electrical power generator 31 A generates low frequency electrical power that is conveyed by coaxial cable 31B through bulkhead 20 to the inside of the rotating drum. This power is transmitted to electrical connectors 31E and heating element 31C. Heating element 31C is made of a suitable material, such as MoSi$_2$, which has an acceptable service life when operating at 3400° F. Element 31C radiates infrared waves which travel through transparent shield 31D, made of an infrared transparent material, such as quartz. The radiant heat emitted by element 31C travels through shield 31D to the material to be heated. The radiant heat from element 31C is also radiated to a thin film that accumulates on the outer surface of shield 31D and re-radiates the infrared energy to the material and shield 31 D obtains the temperature of such thin film.

BRIEF DESCRIPTION OF THE PREFERRED EMBODIMENTS

Referring now to FIG. 4, there is shown a mounted cylindrical rotating drum 10 with its inlet end to the left of the viewer and its outlet end to the right of the viewer. Drum 10 is provided with support rings 12 that roll on roller wheels 14. Mountings for supporting the roller wheels 14 and a power source for rotating the drum are not shown, since many variations of such as are suitable are known by those familiar with the art. The inlet end of drum 10 is attached to bulkhead 20 by seal 24. Seal 24 is provided to prevent fluid flow between the outside of the drum and the inside of the drum and rotatably engages the end of the bulkhead 20. Bulkhead 20 is provided with microwave waveguide 32 which, in turn, is connected to microwave generator 30. Microwave waveguide 32 is extended into drum 10 as shown so that the microwaves 34 from waveguide 32 travel into the drum as shown by arrow 36. Bulkhead 20 is provided with microwave choke 22 which cooperates with drum 10 to prevent the escape of microwaves from the inside of the drum to the outside. Microwave choke 22 is not shown in detail in the drawings, since suitable designs are known by those familiar with the art and many different designs and sizes are used on millions of household microwave ovens today. A microwave choke 22 may also be placed on bulkhead 60 but is not shown by the drawings because it is not usually needed there. Bulkhead 20 is also provided with feed line 50 for transferring the material to the inside of drum 10 as shown by arrow 52. Drum 10 is placed on a slope as shown by angle 16 to allow the material to flow by gravity from the drum inlet to the drum outlet.

Solids separator 60 is rotatably connected to drum 10 through seal 62 that seals the inside of drum 10 and solids separator 60 from the outside and allows solids separator 60 to be stationary while drum 10 rotates. The solids flow by gravity from the outlet end of drum 10 to the bottom of solids separator 60 as shown by arrow 54 and gas lock valve 64 allows the solids to flow out as shown by arrow 68 but prevents the gases from flowing out with the solids. The gases flow upwardly in solids separator 60 as shown by arrow 56 and out of solids separator 60 through line 66.

Insulation 17 is optionally affixed to selected portions of the outside of drum 10 to keep selected portions of drum 10 from getting too cool and radiation fins 19 are optionally affixed to other selected portions of the outside of drum 10 to radiate heat from drum 10 and to keep other selected portions of drum 10 from getting too hot. Alternatively, other cooling and heating elements well known to those skilled in the art may be used for these purposes. Reflectors 40 are placed inside the drum, as shown, to reflect the unabsorbed microwaves back toward the drum inlet. Reflectors 40 are made of a microwave reflective material, such as stainless steel or aluminum. The reflectors are spaced inwardly from the cylindrical wall of drum 10 to form a gap 42 between the reflectors and the drum wall, to allow the passage of material being processed. Reflectors 40 are suitably longitudinally spaced apart as shown at 44 to provide a microwave choke and to minimize the passage of microwaves to the drum outlet.

Bulkhead 20 is provided with gas line 51 to selectively allow a selected gas to flow in and through drum 10. This gas can be an inert gas, such as nitrogen or steam, a hydrogen gas as used for reforming a straight run gasoline in the presence of a platinum catalyst, $H_2S$ as used to convert the metal contaminants on a catalyst to a metal sulfide, or any other gas used to chemically alter the material being processed in the presence of a microwave energy.

The inside surface of drum 10 is made of a microwave reflective material, such as stainless steel or aluminum. In some cases, the microwave reflective material on the inside of drum 10 may be coated with a microwave transparent material, to minimize corrosion. Such a microwave reflective material is also used on bulkheads 20, 60, reflector 40, and conduits 32, 50, and 51. The inside of waveguide 32 is sealed from the inside of drum 10 by plate 38, which is made of a material that is transparent to microwaves, such as a quartz material, that allows microwaves 34 to pass from waveguide 32 to the inside of drum 10.

In operating the invention of FIG. 4, drum 10 is supported by support rings 12 and is rotated by rotation means (not shown). Microwave and feed bulkhead 20 and product separator 60 do not rotate with the drum but connect to the ends of drum 10 through seals 24, 62, and choke 22 to prevent communication between the inside of drum 10, bulkhead 20, and separator 30 and the external environment. Feed to be processed is placed in drum 10 inlet as shown by arrow 52. A selected gas is selectively injected inside drum 10 through pipe 51. The material being processed is physically and/or chemically altered when exposed to the microwave energy and, selectively, the selected gas.

Processed solids and/or liquids flow out of drum 10 as shown by arrow 54, through vapor lock valve 64 and out the apparatus as shown by arrow 68. Gasses flow out of drum 10 as shown by arrow 56 and out transfer pipe 66.

Figure 5:
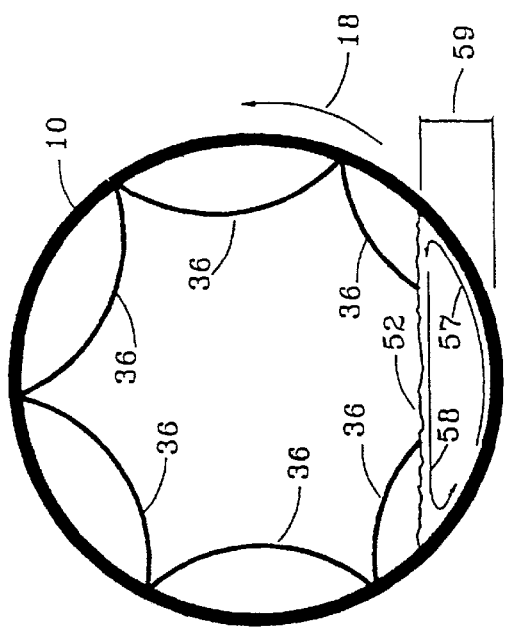
FIG. 5 is a schematic cross-sectional view of the drum (Section A—A of FIG. 4) showing the rotation of the drum and the movements of the processed materials in the drum and one configuration of the microwaves inside the drum.

Reference is now made to FIG. 5, which is an internal view of drum 10 taken at section 5—5 of FIG. 4. Drum 10 is rotating in a counter clockwise direction to the viewer as shown by arrow 18. The material 52 being processed is in the bottom of the inside of drum 10 and has a depth as shown at 59. The material 52 adjacent to the inside wall of drum 10 is caused, by friction, to rotate in the same direction as the rotation of the drum, as shown by arrow 57. So, when the drum rotates in the direction 18 shown, the bottom layers of the material 52 moves from left to right and the top layers of the material 52 moves from right to left as shown by arrow 58. This continual rotation of the material in the drum exposes a thin layer of all material being processed directly to the microwave energy.

Microwaves can take many shapes inside of a circular drum. The shapes of microwave 36 in FIG. 5 are one desired approach to utilizing microwave energy. Controlling the shape of the microwave in a specific vessel is well known to those skilled in the art. Since the wavelength of the microwave is dependent on its frequency, a microwave shape such as that shown in FIG. 5 is determined from the relationship of the inside diameter of drum 10 to the frequency of microwave 36.

The apparatus of FIG. 4 can be used for many special operations. For example, it can be used for the final processing of a hazardous waste material that has had the water and other low boiling components previously removed by a thermal desorber. Most of the heat required to process most hazardous waste material is used to remove the water and low boilers, which requires heating the material only to a temperature of 400° F. to 1000° F. After the water and low boilers have been removed from the waste material, the material can then be processed to 1500° F., or higher, by the apparatus of FIG. 4, with a substantially lower heat load.

Alternatively, the waveguide 32 can be inserted through bulkhead 60 to the inside of the exit end of drum 10 and a thermal heat can be applied to the outside wall at the inlet end of drum 10. The thermal heat then removes the water and low boilers from the material and the microwave is only used for the final processing of the waste.

The apparatus of FIG. 4 can be used to process an oil emulsion. Such oil emulsions sometimes contain oil globules that are chemically or electrically bound and contain smaller water and solid modules. These chemically or electrically bound modules are broken by the microwave, or by the differential expansion of the oil and water droplets. The oil emulsion is fed to drum 10 by pipe 50 and all of the oil emulsion is directly exposed to the microwave as shown by the continuous circulation of surface 58 of FIG. 5. After the oil emulsion has been processed by the apparatus of FIG. 4, it can be placed in a tank for settling of the water and solids, or the water and solids can be removed by a centrifuge.

The apparatus of FIG. 4 can also be used in the processing of a catalyst. A specific use is to demetalize fluid catalytic cracking catalyst such as $SiO_2Al_2O_3$. One method used today to demetalize such catalyst is to heat the catalyst to 1400° F. to 1550° F. in the presence of $H_2S$ gas. This converts the contaminating metal to metal sulfide. The catalyst is then chlorinated to make the contaminated metal water soluble. The catalyst is then demetalized by water washing.

It is difficult to expose the catalyst to $H_2S$ at 1500° F. One method is to fluidize the catalyst in a fluidized bed that is fluidized with an upward flow of $H_2S$. It has been found that fins attached to the inside of drum 10 can lift the catalyst and let the catalyst fall through the microwave energy in the presence of $H_2S$, exposing all of the hot catalyst to the $H_2S$. Such fins are shaped to lift the catalyst and let it fall forward from the inlet toward the outlet of drum 10. Accordingly, the fins have a dual purpose—lifting the catalyst and letting it fall through the $H_2S$ gas and microwave, and moving the catalyst from the inlet to the outlet of the drum. Such fins are well known to those familiar with the art, and therefore are not shown in FIG. 4 of the drawings.

The apparatus of FIG. 4 can also be used to reform gasoline. Currently, low octane straight run gasoline is reformed into higher octane gasoline by flowing the gasoline through a platinum catalyst bed at a temperature of 700° F. to 1000° F. The temperature of the gasoline is lowered when hydrogen is removed from the gasoline molecule in the catalyst bed and the gasoline no longer reacts to the catalyst. Accordingly, the gasoline must be reheated and flowed through another catalyst bed. This procedure is repeated, usually two to four times.

The gasoline can be reformed in one step by flowing the gasoline, with a catalyst, through the apparatus of FIG. 4. The microwave heating keeps the catalyst and the gasoline at the selected temperature. The hot catalyst can be recirculated, as explained later for FIG. 6.

It is sometimes desirable to use infrared waves together with microwaves in the apparatus of FIG. 4. In such case, the infrared apparatus shown by FIG. 3 can replace waveguide 32 of FIG. 4.

The apparatus of FIG. 6 is the same as that of FIG. 4 except that carriers 78 are placed inside the drum and a spirally wound conduit 70 is connected on the outside of the drum to rotate with the drum. Carriers 78 are placed in the inlet of drum 10 and flow down the drum with the feed by gravity. These carriers, which are usually round or hexagonal balls of steel, tend to mull the feed and scrape and clean the inside wall of drum 10 as they tumble and roll down drum 10 with the feed. The carriers can be either microwave reflective or microwave absorptive, depending on the material being processed and the desired effect of the carriers.

Affixed to the outside of drum 10 is a spirally wound conduit 70 that is wound around and rotates with the drum. When the drum 10 rotates, carriers 78 that are placed in the inlet end of the conduit move from the inlet end 72 to the outlet end 76, then drop into the inlet end of the drum, and therefore are recirculated from the outlet end of drum 10 and back to the inlet end of drum 10. A conveyor, such as scoop 74, which may be of the type shown in my U.S. Pat. No. 5,227,026, separates the carriers 78 from particles of solid material being processed and lifts the carriers and deposits them into the inlet 72 of conduit 70. Screen 75, selectively placed in the outlet end of drum 10, has a mesh of a size to allow the passage of comminuted solids but to prevent the passage of the carriers, and allows the solids to flow through and out the outlet end of drum 10 but prevents the carriers from flowing out of drum 10. Although such carriers have been found to be particularly efficient in comminuting solid materials and preventing adherence to the wall of the drum, other means known to those skilled in the art may be used for this purpose.

FIG. 7 is the same as FIG. 6 except that a freely rotating spiral 80 is placed inside drum 10 to rotate therewith and the drum 10 is not necessarily placed on a slope. The feed is pushed longitudinally of the drum by freely rotatable spiral 80 that pushes the feed and carriers from the inlet to the outlet of drum 10. Other known means for moving solid materials may also be used. Such means include, for example, sloping the drum downwardly toward the outlet end, or using the method described in U.S. Pat. No. 5,425,792.

Figure 8:
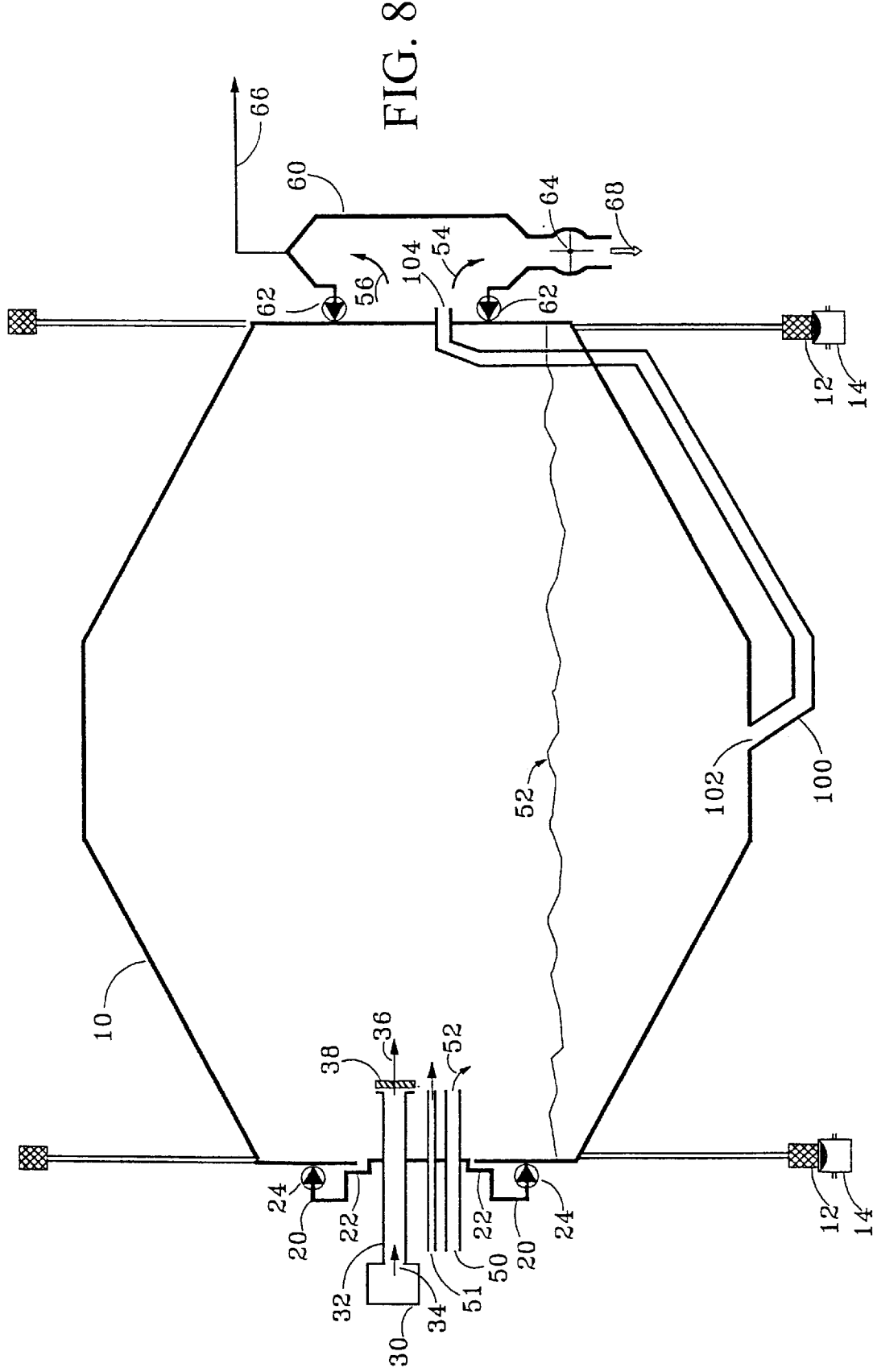
FIG. 8 is a schematic drawing of another embodiment of the invention showing how the material can be processed by a rotating drum using the batch process.

It is sometimes necessary to expose the material to a source of electromagnetic energy for a longer time than is practical in a rotating drum on a continuous basis. The apparatus of FIG. 8 shows one method of exposing the material to such energy in a rotating drum by using the batch method. Material 52 is placed inside rotating drum 10 by pipes 50 and 51. Electromagnetic energy is transmitted to the inside of drum 10 by waveguide 32. Hollow tube 100 is spiraled in such a direction that material in drum 10 does not flow from the inlet 102 to the outlet 104 while the drum is rotating in a first selected direction and the material is being exposed to the electromagnetic energy. However, after the material has been processed for a suitable amount of time, the direction of rotation of the drum is reversed and then the spiraled tube 100 allows material 52 to flow through inlet 102, tube 100, and outlet 104 into bulkhead container 60. This removes all of the material 52 from drum 10, and the process is then repeated.

The movement of material 52 is in accordance to that shown in FIG. 5. However, fins, not shown in FIG. 8, may be attached to the inside wall of drum 10 to lift and further expose the material to the electromagnetic energy and the gas inside the drum. Carriers, not shown, may be placed inside drum 10, and a screen, not shown, may be placed at the inlet 102 to keep such carriers inside the drum but let the material be removed.

What is claimed is:

1. An apparatus for heat processing of material comprising:

a drum rotatable about its longitudinal axis having an inlet end and an outlet end;

a non-rotatable first bulkhead attached to and closing the inlet end of said drum said first bulkhead including an opening therethrough for flowing the material to be processed to the inside of said drum;

a rotatable spiral inside of said drum and wound in a direction so as to move the material from the inlet end to the outlet end of said drum when said drum rotates;

a source of electromagnetic microwave energy extending into said drum capable of imparting energy to said material while said material is moving through said drum; and a non-rotatable second bulkhead, attached to and closing the outlet end of said drum, said second bulkhead including an opening therethrough for removing the processed material from the outlet end of said drum; and at least one microwave reflective plate positioned between the inlet end and the outlet end of said drum, said reflectors being spaced inwardly from the cylindrical wall of said drum so as to allow the passage of material being processed between the reflectors and the drum wall positioned to minimize the intensity of the microwave energy traveling from the inlet end to the outlet end of said drum.

2. An apparatus according to claim 1 wherein the source of microwave energy comprises a waveguide made of microwave reflective material extending through said first bulkhead with the inlet end of said waveguide attached to a microwave generator and the outlet end of said waveguide extending inside said drum inlet end, to convey said microwave energy from said generator to the inside of said drum inlet.

3. An apparatus according to claim 2 wherein said waveguide outlet end is covered with a plate made of microwave transparent material that allows the microwave energy to pass from the inside of said waveguide to the inside of said drum but prevents material on the inside of said drum from passing through to the inside of said waveguide.

4. An apparatus according to claim 1 wherein said first bulkhead includes means for introducing a gaseous material to the inside of said drum inlet and said second bulkhead includes means to separate gas from processed solid and liquid material and to separately remove said gas from said drum outlet.

5. An apparatus for heat processing of material, comprising:

a drum rotatable about its longitudinal axis having an inlet end and an outlet end;

a non-rotatable first bulkhead, attached to and closing the inlet end of said drum, said first bulkhead including an opening therethrough for flowing the material to be processed to the inside of said drum;

means for moving said material from the inlet end of said drum to the outlet end of said drum;

a source of electromagnetic microwave energy extending into said drum capable of imparting energy to said material while said material is moving through said drum;

a non-rotatable second bulkhead, attached to the outlet end of said drum, said second bulkhead including an opening therethrough for removing the processed material from the outlet end of said drum; and carriers that flow with the material from the inlet end to the outlet end of said drum, said carriers being made of a catalytic material for reforming said first named material, and said drum including means for separating said carriers from said material at the outlet end of said drum and returning said carriers to the inlet end of said drum.

6. An apparatus for heat processing of material, comprising:

a drum rotatable about its longitudinal axis having an inlet end and an outlet end;

a non-rotatable first bulkhead, attached to and closing the inlet end of said drum, said first bulkhead including an opening therethrough for flowing the material to be processed to the inside of said drum;

means for moving said material from the inlet end of said drum to the outlet end of said drum;

a source of electromagnetic microwave energy extending into said drum capable of imparting energy to said material while said material is moving through said drum;

a non-rotatable second bulkhead, attached to the outlet end of said drum, said second bulkhead including an opening therethrough for removing the processed material from the outlet end of said drum; and said source of microwave energy comprising a shielded electrical cable extending through said first bulkhead with the inlet end of said cable attached to a microwave generator to receive microwave energy generated by said microwave generator, the cable having an unshielded section inside the drum, whereby microwave energy is conveyed through said first bulkhead to a selected section inside of said drum inlet.

7. An apparatus for heat processing of a subject material, comprising:

a drum rotatable about its longitudinal axis having an inlet end and an outlet end;

a non-rotatable first bulkhead, attached to and closing the inlet end of said drum, said first bulkhead including an opening therethrough for flowing the subject material to be processed to the inside of said drum;

means for moving the material from the inlet end of said drum to the outlet end of said drum;

a source of electromagnetic microwave energy extending into said drum capable of imparting energy to the subject material while said material is moving through said drum, thereby transforming the subject material into a processed material; and a non-rotatable second bulkhead, attached to and closing the outlet end of said drum, said second bulkhead including an opening therethrough for removing the processed material from the outlet end of said drum; and at least one microwave reflective plate positioned between the inlet end and the outlet end of said drum, said reflectors being spaced inwardly from the cylindrical wall of said drum so as to allow the passage of material being processed between the reflectors and the drum wall positioned to minimize the intensity of the microwave energy traveling from the inlet end to the outlet end of said drum.

8. The apparatus according to claim 7 wherein said means to move the material from the drum inlet end to the drum outlet end comprises a freely rotating spiral wound in a suitable direction to move the material from the inlet end to the outlet end of said drum when said drum rotates.

9. The apparatus according to claim 7 wherein said means to move the material from the inlet end to the outlet end of said drum consists of placing the drum on a slope such that gravity moves the material.

10. The apparatus according to claim 7 wherein said means to move the material from the inlet end to the outlet end of said drum consists of fins attached to the inside of said drum and extending at an acute angle to the axis of the drum to lift said material and cause the material to move in the proper direction when the drum rotates.

11. The apparatus according to claim 7, further including a plurality of carriers that flow with the material from the inlet end to the outlet end of said drum and means for separating said carriers from said material at the outlet end of said drum and returning said carriers to the inlet end of said drum such that said carriers continue to recirculate in said drum and do not leave said drum.

12. The apparatus according to claim 7 wherein said carriers comprise a microwave reflective material.

13. The apparatus according to claim 7 wherein said carriers comprise a microwave absorptive material.

14. The apparatus according to claim 7 wherein said carriers comprise a catalytic material capable of reforming the subject material.

15. The apparatus according to claim 7 wherein said source of microwave energy comprises a shielded electrical cable extending through said first bulkhead with the inlet end of said cable attached to a microwave generator to receive microwave energy generated by said microwave generator, the cable having an unshielded section inside the drum, whereby microwave energy is conveyed through said first bulkhead to a selected section inside of said drum inlet.

16. The apparatus according to claim 7 wherein said first and second bulkheads each include a microwave choke to contain said microwave energy inside said drum and prevent said microwaves from escaping the inside of said drum.

17. The apparatus according to claim 7, further including an external heat source positioned to apply heat to a portion of the wall of the drum.

* * * * *